Sept. 27, 1932.  C. C. FARMER ET AL  1,879,669
FLUID PRESSURE BRAKE
Filed Nov. 13, 1930  3 Sheets-Sheet 3
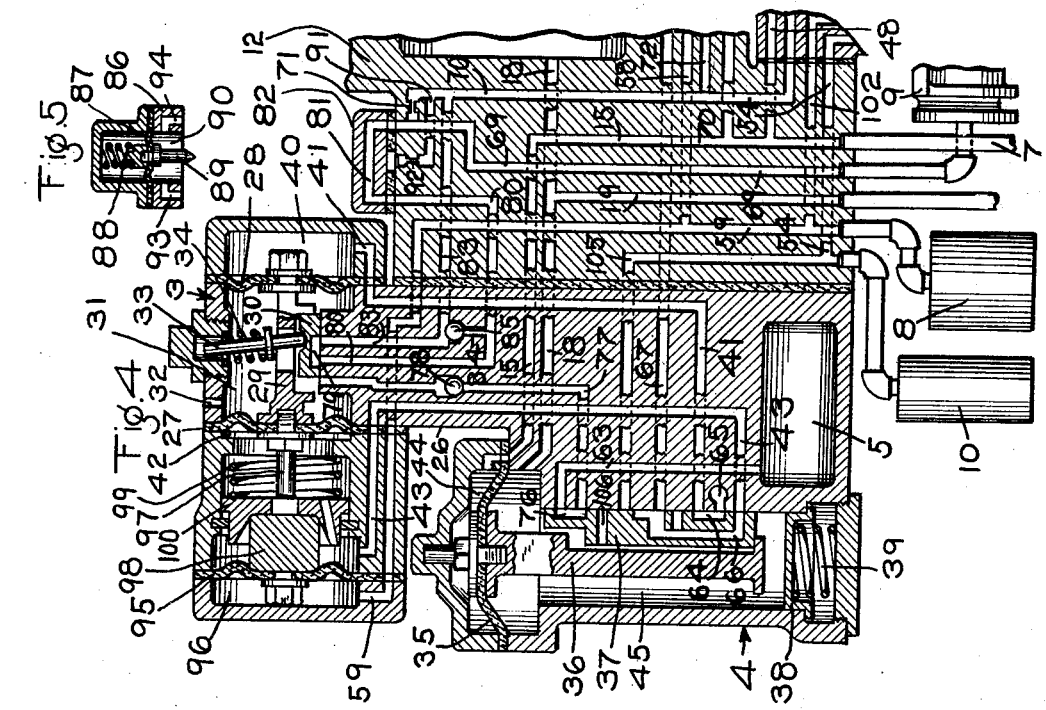
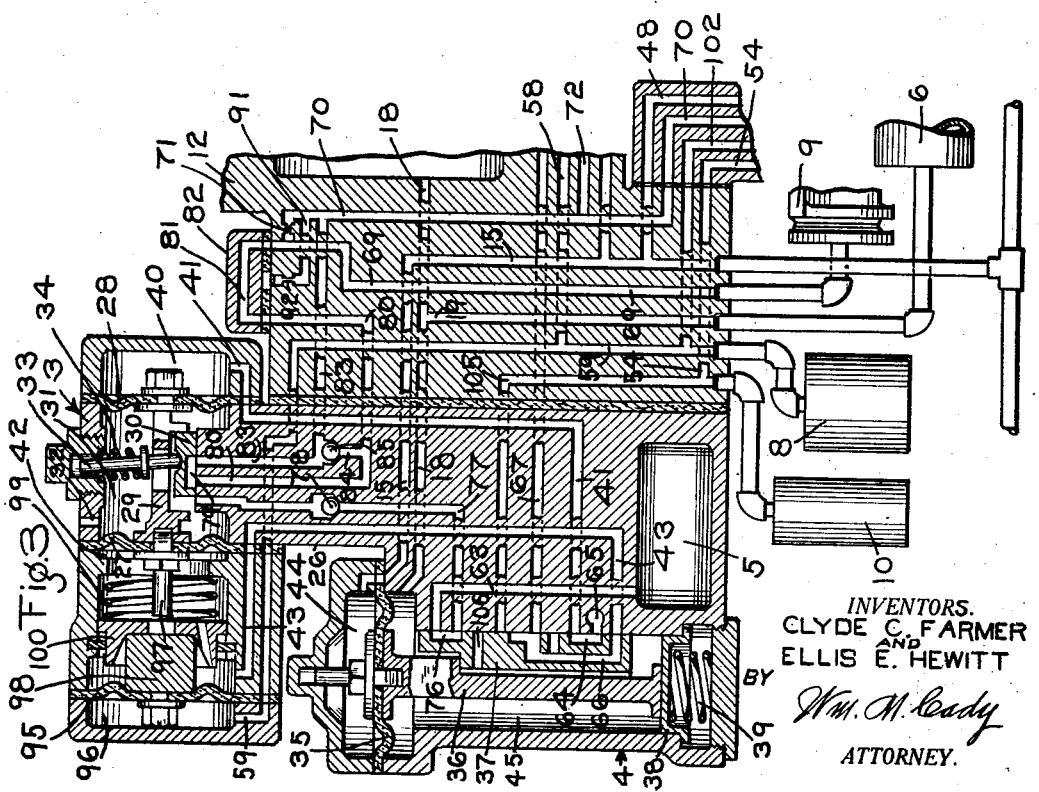
INVENTORS.
CLYDE C. FARMER
AND
ELLIS E. HEWITT
BY
Wm. M. Cady
ATTORNEY.

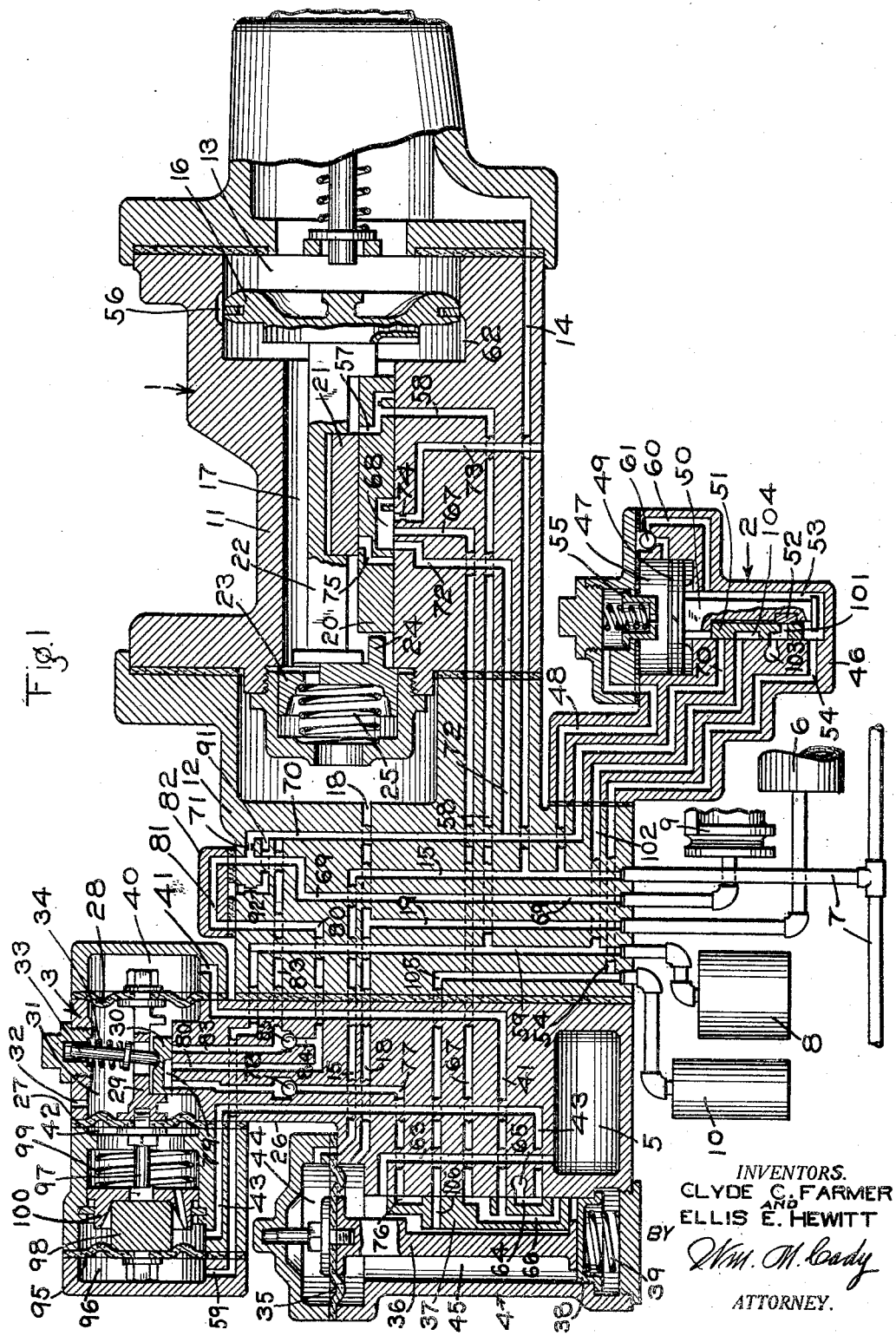

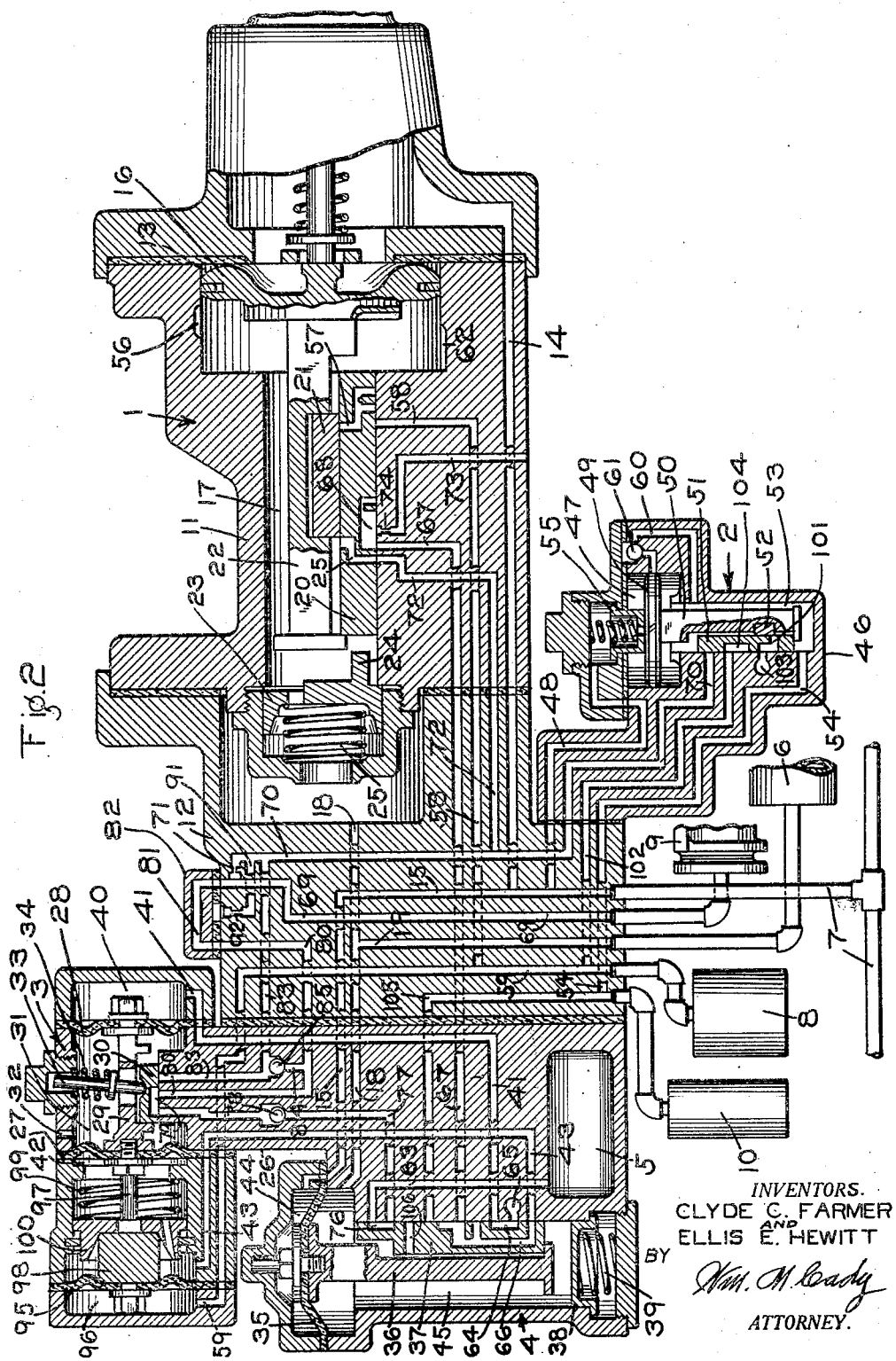

Patented Sept. 27, 1932

1,879,669

UNITED STATES PATENT OFFICE

CLYDE C. FARMER, OF PITTSBURGH, AND ELLIS E. HEWITT, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA

FLUID PRESSURE BRAKE

Application filed November 13, 1930. Serial No. 495,396.

This invention relates to fluid pressure brakes, and more particularly to means for delaying the build up of brake cylinder pressure on cars at the head end of the train, so as to prevent severe shocks, due to the running in of the slack in the train, when the brakes are applied on cars at the head end of the train in advance of applying the brakes on cars at the rear end of the train.

One object of our invention is to provide improved means for delaying the build up of pressure in the brake cylinder on cars at the head end of a train.

Other objects and advantages will appear in the following more detailed description of the invention.

In the accompanying drawings; Fig. 1 is a diagrammatic sectional view of a car fluid pressure brake equipment embodying our invention, and showing the parts in normal release position and as assumed at the head end of the train in releasing after a service application; Fig. 2 a similar view of the equipment shown in Fig. 1, but showing the parts in service application position on cars at the head end of the train; Fig. 3 a view of the selector cut-out portion of the equipment shown in Fig. 1, showing the parts in the positions assumed on cars at the rear end of the train in releasing after a service application; Fig. 4 a view similar to Fig. 3, showing the parts in the positions assumed on cars at the rear end of the train, when a service application of the brakes is effected; and Fig. 5 a sectional view of a delay valve device, which may be employed to initially delay the build up of pressure in the brake cylinder.

The equipment may comprise a triple valve device 1, an emergency valve device 2, a selector cut-out valve device 3, a selector pilot valve device 4, an inshot bulb 5, an auxiliary reservoir 6, a brake pipe 7, an emergency reservoir 8, a brake cylinder 9, and a quick action reservoir 10.

The triple valve device 1 comprises a casing 11, which is secured to a pipe bracket 12 and which has a piston chamber 13 connected through passages 14 and 15 with brake pipe 7 and containing piston 16. At the opposite side of piston 16 is a valve chamber 17 connected through passages 18 and 19 with auxiliary reservoir 6 and containing a main slide valve 20 and a graduating slide valve 21 adapted to be operated by piston 16, through piston stem 22.

The triple valve device is of the retarded release type, and consequently is provided with a retarded release stop member 23, which is adapted to engage the rear end of the piston stem 22 and which is provided with a lug 24, adapted to engage the main slide valve 20. Movement of the stop member 23 by piston stem 22 is opposed by a coil spring 25.

The selector cut-out valve device 3 and the selector pilot valve device 4 are contained in a casing 26 secured to the pipe bracket 12, and the valve device 3 comprises flexible diaphragms 27 and 28 connected together by a stem 29, said stem being adapted to operate a slide valve 30. The valve chamber 31 intermediate said diaphragms is open to the atmosphere through port 32. A rocking pin 33 engages the valve 30 and is subject to the pressure of a coil spring 34, so as to yieldingly press said valve to its seat.

The selector pilot valve device 4 comprises a flexible diaphragm 35 having a stem 36 for operating a slide valve 37. A stop member 38, subject to the pressure of a coil spring 39, yieldingly opposes downward movement of stem 36.

Chamber 40 at the outer face of diaphragm 28 is connected to passage 41 leading to the seat of slide valve 37, and chamber 42 at the outer face of diaphragm 27 is connected to passage 43, also leading to the seat of slide valve 37. Chamber 44, at the outer face of diaphragm 35 is connected to the brake pipe 7, through passage 15, and valve chamber 45 is connected to the auxiliary reservoir 6, through passages 18 and 19.

The emergency valve device 2 comprises a casing 46 secured to the pipe bracket 12 and having a piston chamber 47 connected to the brake pipe 7 through passages 48 and 15 and containing piston 49, carrying a stem 50. The stem 50 is adapted to operate a main slide valve 51 and an auxiliary valve 52, contained in valve chamber 53. Said valve chamber 53 is connected, through passage 54 with quick action reservoir 10. A yielding stop member 55 opposes outward movement of piston 49, beyond service position.

In operation, when the brake pipe is charged with fluid under pressure, if the triple valve piston 16 be in full release position, as shown in Fig. 1, fluid under pressure flows through the feed groove 56 to valve chamber 17 and thence through passages 18 and 19 to the auxiliary reservoir 6. The valve chamber 45 of the selector pilot valve device 4 is also charged with fluid under pressure through passage 18. The emergency reservoir 8 is charged with fluid under pressure from valve chamber 17, through port 57 in main slide valve 20 and passages 58 and 59. Fluid under pressure from the brake pipe 7 also flows through passage 48 to piston chamber 47 of the emergency valve device 2 and thence through passage 60 past check valve 61 to valve chamber 53. Fluid under pressure from valve chamber 53 flows through passage 54 to quick action reservoir 10.

If the triple valve piston 16 be in retarded release position, the valve chamber 17 and the auxiliary reservoir 6 are charged with fluid under pressure through the feed groove 62, which has a more restricted flow area than the groove 56.

According to our invention, means are provided whereby the rate of build up of pressure in the brake cylinder on cars at the head end of the train is slowed down, so that the brakes on the cars at the rear of the train will be applied more nearly in synchronism with the brakes on cars at the head end of the train and for this purpose, the selector cut-out valve device 3 is provided having one position in which the rate of flow to the brake cylinder in effecting a service application of the brakes is restricted, and another position in which the usual full rate of flow is permitted.

The operation of the selector cut-out valve device is controlled by the selector pilot valve device 4, which in turn is operated according to the rate of increase in brake pipe pressure.

In starting out from a station or terminal, a service application of the brakes is usually made to test the brakes of the train and when the brake pipe pressure is reduced to effect a service application of the brakes, the fluid pressure in chamber 44 of the selector pilot valve device 4 is also reduced, so that on every car of the train, the diaphragm 35 is flexed upwardly by the higher pressure in the valve chamber 45 to the position shown in Figs. 2 and 4. Now when the brake pipe pressure is increased to effect the release of the brakes, the rise in brake pipe pressure on cars at the rear of the train is only sufficient to move the diaphragm 35, until the stem 36 engages the yielding stop 38.

On account of the lost motion between the stem 36 and the slide valve 37, the slide valve 37 will not be shifted from the position shown in Fig. 2, so that on cars at the rear of the train, the slide valve 37 will be set in this position. On cars at the front end of the train, however, where the rise in brake pipe pressure is rapid, the diaphragm 35 will be flexed downwardly, beyond the position shown in Fig. 3, against the resistance of the spring stop 38, so that slide valve 37 is shifted to the position shown in Fig. 1, which is therefore the position in which the slide valve 37 remains on cars at the head end of the train, it being noted that although the diaphragm 35 and the stem 36 moves back to the normal position shown in Fig. 1, when the fluid pressures on opposite sides of the diaphragm 35 equalize, that is, the brake pipe and auxiliary reservoir pressures, the lost motion between the stem 36 and the slide valve 37 prevents the stem from moving the slide valve.

On cars at the rear end of the train, where the slide valve 37 is moved to the position shown in Fig. 3 in releasing the brakes, chamber 40 is connected through passage 41, and cavity 64 in slide valve 37 with exhaust port 65, so that chamber 40 is at atmospheric pressure. Chamber 42 is connected, through passage 43, and cavity 66 in slide valve 37 with passage 67. Passage 67 leads to the seat of slide valve 20 and in releasing the brakes is open to exhaust cavity 68, so that fluid under pressure is supplied to passage 67, when the brake cylinder 9 is connected to the exhaust cavity 68, through passage 69, passage 70 containing the choke 71, and passage 72. At the same time, fluid is being exhausted from the brake cylinder, through cavity 68 and exhaust passage 73, containing the choke 74, but this does not prevent the initial flow of fluid from the brake cylinder to passage 67.

As a result, on cars at the rear end of the train, the chamber 40 of the selector cut-out valve device is vented to the atmosphere, while fluid under pressure from the brake cylinder is supplied to chamber 42, so that the diaphragms 27 and 28 are shifted to the right from the normal position, the slide valve 30 being thus moved to the position shown in Fig. 3. As the pressure in the brake cylinder reduces to atmosphere by flow through the exhaust cavity 68 and the exhaust port 73, the pressure in chamber 42 also reduces to atmospheric pressure, so that the diaphragms 27 and 28 will return to their normal position, as shown in the drawings, due to their inherent resiliency, the lost motion between the slide valve 30 and the stem 29, permitting this movement. The slide valve 30, however, is maintained in its position of adjustment by the pressure of spring 34 acting on the valve 30, through the pin 33.

On cars at the head end of the train, when the slide valve 37 is moved to the position shown in Fig. 1, chamber 40 is connected to passage 67, through cavity 66 in slide valve 37, and passage 41, so that fluid under pressure from the brake cylinder is now supplied to chamber 40, in releasing the brakes. Chamber 42 is connected to exhaust port 65, through passage 43 and cavity 64 in slide valve 37, so that the fluid pressure in chamber 40 will shift the diaphragms 27 and 28 to the left from the normal position. The slide valve 30 is thus moved to the position shown in Fig. 1, and is held in this position by the pressure of spring 34. The diaphragms 27 and 28 return to the normal position, as the pressure in the chamber 40 reduces to atmosphere with the brake cylinder by flow through the exhaust port 73, the lost motion between the slide valve 30 and the stem 29 permitting this movement.

It will now be seen that when the train starts out from a station or terminal after the brakes have been applied and then released, the slide valve 37 on cars at the head end of the train will be positioned as shown in Fig. 1, while on cars at the rear end of the train, the slide valve 37 will be positioned as shown in Fig. 2. With the slide valve 37 positioned on the head cars, as shown in Fig. 1, the inshot bulb 5 is connected through passage 63 with valve chamber 45, so that said bulb will be charged from said valve chamber with fluid at auxiliary reservoir pressure.

With the parts adjusted as above described, when a reduction in brake pipe pressure is effected, the triple valve piston 16 moves to service position, as shown in Fig. 2, the triple valve device being of the type in which the piston makes full traverse in effecting a service application of the brakes. Fluid under pressure is then supplied through port 25 in the main slide valve 20 to passage 72 and thence through passage 70 and choke 71 to passage 69 and the brake cylinder, so that fluid under pressure is supplied to the brake cylinder at a restricted rate.

The diaphragm 35, which is more sensitive to movement than the triple valve parts, is initially flexed upwardly when the brake pipe pressure is reduced, so that slide valve 37 is shifted to the position shown in Fig. 2, on all cars of the train. In this position, passage 63, leading to the inshot bulb 5, is connected, through cavity 76 in slide valve 37, with passage 77, leading to the seat of slide valve 30 and containing a non-return check valve 78.

On cars at the head end of the train, the passage 77 is connected, through cavity 79 in selector slide valve 30 with passage 80, which passage is connected, through a cavity 81 in a blanking pad 82 with passage 69. Fluid under pressure is thus initially supplied from the normally charged inshot bulb 5 to the brake cylinder 9, and at a rate and in sufficient volume to insure that the brake cylinder piston will be moved out beyond the usual leakage grooves around the brake cylinder piston, and then the choke 71 must supply the additional fluid pressure required to move the brake cylinder piston far enough to cause the brake shoes to engage the car wheels.

On cars at the rear end of the train, when the slide valve 30 of the selector cut-out valve device is in the position shown in Fig. 4, the cavity 79 in said slide valve connects passage 80 with passage 83, the passage 83 leading directly to passage 70, so that the choke 71 is by-passed, and fluid under pressure is supplied at an unrestricted rate to the brake cylinder from passage 70, through passage 83, cavity 79, passage 80, cavity 81, and passage 69.

It will thus be seen that retardation of the cars at the head end of the train by applying the brakes is delayed, so that time is provided to permit the brakes to be applied on cars at the rear end of the train, and consequently, excessive shocks, due to the running in of the slack, are avoided.

The check valve 78 in the passage 77, prevents back flow from the brake cylinder to the inshot bulb 5, after the bulb has equalized into the brake cylinder.

In order to permit the free release of fluid from the brake cylinder at the rate provided by the triple valve device, a passage 84, containing a check valve 85, connects passage 80 with passage 83, so that in releasing, fluid can flow from the brake cylinder through passage 80, passage 84, and passage 83 to passage 70, as well as through the choke 71, thus permitting the choke 74 to regulate the rate at which fluid is released from the brake cylinder.

If it is desired to permit a more rapid build up of brake cylinder pressure on cars at the head end of the train, after the brakes have been applied on cars at the rear end of the train, a hold back valve device similar to that disclosed in the pending application of Clyde C. Farmer, Serial No. 471,161, filed July 28, 1930, may be employed.

Such a valve device is shown in Fig. 5 of the drawings, and comprises a casing 86 adapted to be applied to the pipe bracket 12 in place of the blanking pad 82. In said casing is disposed a flexible diaphragm 87, subject on one side to the pressure of a coil spring 88. Carried by the diaphragm 87 is a valve 89, which is adapted to control communication from chamber 90 to a passage 91, leading to passage 70 and containing a choke 92. Passages 80 and 69 register respectively with passages 93 and 94 in the casing 86, which open into chamber 90.

With the hold back valve device applied, fluid under pressure will initially flow to the brake cylinder by way of the choke 71 and through passage 69 in the same manner as hereinbefore described, but as soon as the pressure in chamber 90 has been increased sufficiently to overcome the pressure of spring 88, which pressure is only attained after the brakes have been applied on cars at the rear end of the train, the diaphragm 87 will be flexed upwardly, so as to unseat the valve 89 and thereby permit flow of fluid under pressure from passage 70, through passage 91, chamber 90, and passage 94 to passage 69. Thus an increased rate of flow of fluid under pressure to the brake cylinder is provided after the brake cylinder pressure has been built up to a predetermined degree.

In high speed service, it is not essential to retard the application of the brakes on cars at the head end of the train, and means may therefore be provided for cutting out the slow build up of brake cylinder pressure at the head end. For this purpose, an additional flexible diaphragm 95 is provided, the chamber 96 at the outer face of which is connected, through passage 59 with the emergency reservoir 8.

The diaphragm 27 carries a stem 97, which is adapted to be engaged by a member 98, movable with the diaphragm 95, and a spring 99 acts through a follower 100 and the member 98 on the diaphragm 95, in opposition to the pressure in chamber 96.

In low speed service, a lower pressure is usually carried than in high speed service, such as seventy pounds in low speed service, and ninety pounds in high speed service. The spring 99 is such that a pressure of seventy pounds in chamber 96 will not deflect the diaphragm 95, but a pressure of ninety pounds will deflect the diaphragm.

The emergency reservoir is charged from the brake pipe as hereinbefore described, so that the pressure in chamber 96 corresponds with the standard pressure carried in the brake pipe.

When the brake pipe pressure is raised to ninety pounds for high speed service, the corresponding pressure in chamber 96 deflects the diaphragm 95 against the pressure of spring 99 and the stem 97 is then shifted to the right, so that the diaphragms 27 and 28 and slide valve 30 are shifted to the right to the position in which the slow build up is prevented on cars at the head end of the train, and consequently, the brakes are applied at the same rate of build upon all the cars of the train.

When the brake pipe pressure is reduced at a service rate, the emergency piston 49 moves out to engage the stop 55 and the auxiliary valve 52 is moved so that port 101 in slide valve 51 is uncovered. Fluid under pressure is then vented from the valve chamber 53 and the quick action reservoir 10 to exhaust port 103, to prevent further movement of piston 49 to emergency position.

When the brake pipe pressure is reduced at an emergency rate, the piston 49 is quickly shifted to its outer emergency position, against the resistance of the spring stop 55, moving the main valve 51 so that passage 102, leading to emergency reservoir passage 59, is connected, through cavity 104 in slide valve 51, with passage 70. Fluid under pressure is thus supplied to the brake cylinder from the emergency reservoir 8, in addition to fluid under pressure supplied by operation of the triple valve device from the auxiliary reservoir to the brake cylinder, so that an emergency high pressure application of the brakes is effected, the rate of flow of fluid from both reservoirs being controlled according to the position of the selector valve device in substantially the same manner as before described in connection with a service application of the brakes.

When the brake pipe pressure is increased to effect the release of the brakes by moving the brake valve handle to full release position, in the usual manner, the valve chamber 53 of the emergency valve device 2 and the quick action reservoir 10 may become overcharged with fluid under pressure, so that when the brake valve handle is moved to running position, the pressure in the brake pipe reducing to the normal pressure carried in the brake system, may result in the higher or overcharge pressure in the valve chamber 53, causing the operation of the emergency valve device to effect an emergency application of the brakes when not intended.

In order to prevent overcharging of the quick action valve chamber 53 under the above circumstances, a passage 105, connected to the quick action reservoir 10 leads to the seat of the pilot slide valve 37. When the brake pipe pressure is increased to effect the release of the brakes, on cars at the head end of the train, when the brake pipe pressure is temporarily increased above normal, the diaphragm 35 is moved downwardly, against the resistance of the spring stop 38, so that the slide valve 37 assumes the position shown in Fig. 1. In this position, passage 105 registers with port 106 in slide valve 37, so that the quick action reservoir 10 is now connected with valve chamber 45. Valve chamber 45 is open to the auxiliary reservoir, and consequently, the volume of the auxiliary reservoir being relatively large, the quick action reservoir 10 and the emergency valve chamber 53 are prevented from becoming overcharged.

By means of my invention, when an application of the brakes is effected, the build up of pressure in the brake cylinders on cars at the forward end of the train is retarded while the pressure in the brake cylinders on cars at the rear end of the train is permitted to build up at a more rapid rate, so that the brake cylinder pressure on cars at the forward end of the train will not be built up in advance of the built-up of brake cylinder pressure on cars at the rear end of the train, to such an extent as to permit the slack in the train to run in at an excessive rate and thus cause severe and damaging shocks.

Means are also provided for supplying fluid under pressure from a reservoir of limited capacity to the brake cylinders on cars at the front end of the train, so as to ensure that the brake cylinder pistons will be moved out beyond the usual leakage groove, which might otherwise not be the case, due to the slow rate at which fluid under pressure is supplied to the brake cylinders on cars at the front end of the train.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake pipe, and a brake cylinder, of a chamber normally charged with fluid under pressure, valve means operative upon a reduction in brake pipe pressure for effecting the equalization of fluid under pressure from said chamber into the brake cylinder, and means operative on cars at the head end of the train for establishing communication through which fluid is supplied from the chamber to the brake cylinder and operative on cars at the rear end of the train for cutting off said communication.

2. In a fluid pressure brake, the combination with a brake pipe, and a brake cylinder, of a chamber normally charged with fluid under pressure, valve means operative upon a reduction in brake pipe pressure for effecting the equalization of fluid under pressure from said chamber into the brake cylinder, and means operated upon a rapid increase in brake pipe pressure for establishing communication through which fluid is supplied from the chamber to the brake cylinder.

3. In a fluid pressure brake, the combination with a brake pipe, auxiliary reservoir, brake cylinder and a triple valve device operated upon a reduction in brake pipe pressure for supplying fluid under pressure from the auxiliary reservoir to the brake cylinder, of a chamber adapted to be charged with fluid under pressure, a valve mechanism having one position in which communication is established through which fluid is supplied from said chamber to the brake cylinder and another position in which said communication is cut off, and a valve device having one position in which communication is established for charging said chamber with fluid under pressure, and another position in which communication is established, through which said valve mechanism supplies fluid from said chamber to the brake cylinder.

4. In a fluid pressure brake, the combination with a brake pipe and brake cylinder, of a chamber adapted to be charged with fluid under pressure, a valve mechanism having one position in which communication is established through which fluid is supplied from said chamber to the brake cylinder and another position in which said communication is cut off, and a valve device for controlling the operation of said valve mechanism and having one position in which said chamber is charged with fluid under pressure, and another position in which communication is established, through which said valve mechanism supplies fluid from said chamber to the brake cylinder.

5. In a fluid pressure brake, the combination with a brake pipe and brake cylinder, of a chamber adapted to be charged with fluid under pressure, a valve mechanism, having one position in which communication is established through which fluid is supplied from said chamber to the brake cylinder and another position in which said communication is cut off, and a valve device operated by variations in brake pipe pressure for controlling the operation of said valve mechanism, and having one position for charging said chamber with fluid under pressure and another position for establishing communication through which said valve mechanism supplies fluid from said chamber to the brake cylinder.

6. In a fluid pressure brake, the combination with a brake pipe, auxiliary reservoir, and brake cylinder, of a triple valve device having an associated conduit provided with a restricted flow area and operated upon a reduction in brake pipe pressure for supplying fluid under pressure from the auxiliary reservoir to the brake cylinder through said conduit at a restricted rate, a chamber adapted to be charged with fluid under pressure, a valve mechanism having a position for establishing communication through which fluid is supplied from said chamber to the brake cylinder, and a valve device for controlling the operation of said valve mechanism and having one position for charging said chamber with fluid under pressure and another position in which communication is established through which said valve mechanism supplies fluid from said chamber to the brake cylinder.

7. In a fluid pressure brake, the combination with a brake pipe, auxiliary reservoir, and brake cylinder, of a triple valve device having an associated conduit provided with a restricted flow area and operated upon a reduction in brake pipe pressure for supplying fluid under pressure from the auxiliary reservoir to the brake cylinder through said conduit and thereby at a restricted rate, a chamber adapted to be charged with fluid under pressure, a valve mechanism having a position for establishing communication through which fluid is supplied from said chamber to the brake cylinder, and a valve device for controlling the operation of said valve mechanism and operated upon a high rate of increase in brake pipe pressure for charging said chamber with fluid under pressure and upon a reduction in brake pipe pressure for establishing communication through which said valve mechanism supplies fluid from the chamber to the brake cylinder.

8. In a fluid pressure brake, the combination with a brake pipe, of an emergency valve device subject to the opposing pressures of the brake pipe and a quick action chamber and operated upon an emergency reduction in brake pipe pressure for effecting an emergency application of the brakes, a triple valve device operated upon a reduction in brake pipe pressure for effecting an application of the brakes, and a separate valve device subject to brake pipe pressure and operated upon a high rate of increase in brake pipe pressure for connecting said quick action chamber to another chamber.

9. In a fluid pressure brake, the combination with a brake pipe, a brake cylinder and a valve device operated by variations in brake pipe pressure for controlling the supply and release of fluid under pressure to and from the brake cylinder, of means for retarding the rate of flow of fluid under pressure to the brake cylinder, a selector valve device operated by variations in fluid pressure and movable to one position for rendering said means effective and movable to another position for rendering said means ineffective to retard the rate of flow of fluid to the brake cylinder, and valve means subject to variations in brake pipe pressure and operated by a relatively high rate of increase in brake pipe pressure for varying the fluid pressure on said selector valve device to effect the movement thereof to the position in which said retarding means is rendered effective.

10. In a fluid pressure brake, the combination with a brake pipe, a brake cylinder and a valve device operated by variations in brake pipe pressure for controlling the supply and release of fluid under pressure to and from the brake cylinder, of means for retarding the rate of flow of fluid under pressure to the brake cylinder, a selector valve device operated by variations in fluid pressure for rendering said means either effective or ineffective to retard the rate of flow of fluid to the brake cylinder, and valve means subject to variations in brake pipe pressure for controlling the operation of said selector valve device, said valve means being operated when the rate of increase in brake pipe pressure is relatively high to effect the operation of said selector valve device to render the retarding means effective to retard the rate of flow of fluid to the brake cylinder and operated when the rate of increase in brake pipe pressure is relatively low to effect the operation of said selector valve device to render said retarding means ineffective to retard the rate of flow of fluid to the brake cylinder.

11. In a fluid pressure brake, the combination with a brake pipe, a brake cylinder, a reservoir charged with fluid under pressure, and a valve device operated by a reduction in brake pipe pressure for supplying fluid under pressure from said reservoir to the brake cylinder, of means for retarding the rate of flow of fluid under pressure to the brake cylinder, a selector valve device operated by variations in fluid pressure for rendering the retarding means ineffective to retard the rate of flow of fluid to the brake cylinder, and valve means subject to the opposing pressures of the brake pipe and said reservoir for controlling the pressure of fluid on said selector valve device.

12. In a fluid pressure brake, the combination with a brake pipe, a brake cylinder and a valve device operated by variations in brake pipe pressure for controlling the supply and release of fluid under pressure to and from the brake cylinder, of means for retarding the rate of flow of fluid under pressure to the brake cylinder, a selector valve device operated by variations in fluid pressure for rendering said means either effective or ineffective to retard the rate of flow of fluid to the brake cylinder, said selector valve device being operative by fluid under pressure released from the brake cylinder in releasing the brakes, a valve operative to one position to establish communication through which fluid under pressure released from the brake cylinder is supplied to one side of said selector valve device and for also establishing communication through which the opposite side is connected to the atmosphere, and having another position in which said communications are reversed, and means operated by variations in brake pipe pressure for positioning said valve.

13. In a fluid pressure brake, the combination with a brake pipe, a brake cylinder and a valve device operated by variations in brake pipe pressure for controlling the supply and release of fluid under pressure to and from the brake cylinder, of means for retarding the rate of flow of fluid under pressure to the brake cylinder, a selector valve device operated by variations in fluid pressure for rendering said means either effective or ineffective to retard the rate of flow of fluid to the brake cylinder, said selector valve device being operated by fluid under pressure released from the brake cylinder in releasing the brakes, a valve operative to one position to establish communication through which fluid under pressure released from the brake cylinder is supplied to one side of said selector valve device and for also establishing communication through which the opposite side is connected to the atmosphere, and having another position in which said communications are reversed, and a movable abutment operated by variations in fluid pressure for positioning said valve.

14. In a fluid pressure brake, the combination with a brake pipe, a brake cylinder and a brake controlling valve device operated upon a reduction in brake pipe pressure for supplying fluid under pressure to the brake cylinder and operated on an increase in brake pipe pressure for releasing fluid under pressure from the brake cylinder, of means for retarding the rate of flow of fluid to the brake cylinder, valve mechanism operated by fluid under pressure supplied to one side thereof to render the retarding means effective and operated by fluid under pressure supplied to the opposite side to render the retarding means ineffective, and a valve device normally operative according to the rate of increase in brake pipe pressure in releasing the brakes for establishing communication through which fluid under pressure released from the brake cylinder through the brake controlling valve device is supplied to operate said valve mechanism, said valve device being operative upon a reduction in brake pipe pressure to supply fluid under pressure from the brake cylinder when fluid under pressure is retained in the brake cylinder to cause the valve mechanism to operate to render the retarding means ineffective.

15. In a fluid pressure brake, the combination with a brake pipe, a brake cylinder and a valve device operated by variations in brake pipe pressure for controlling the supply and release of fluid under pressure to and from the brake cylinder, of means for retarding the rate of flow of fluid under pressure to the brake cylinder, a selector valve device having one position for rendering the retarding means effective and another position for rendering said retarding means ineffective, and valve means normally operative to control the operation of said selector valve device according to the rate of increase in brake pipe pressure in releasing the brakes, and operative upon a reduction in brake pipe pressure in effecting an application of the brakes for controlling the operation of said selector valve device to render the retarding means ineffective when pressure is retained in the brake cylinder.

16. In a fluid pressure brake equipment, the combination with a brake pipe and a triple valve device operated by variations in brake pipe pressure for controlling the supply and release of fluid under pressure to and from the brake cylinder, of means for retarding the rate of flow of fluid under pressure to the brake cylinder, a selector valve device operative by fluid under pressure for rendering the retarding means either effective or ineffective to retard the rate of flow of fluid to the brake cylinder, valve means operated by variations in fluid pressure for controlling the operation of said selector valve device, and a valve mechanism operated when the equipment is charged with fluid at a pressure exceeding a predetermined degree for causing such selector valve device to operate to render the retarding means ineffective.

17. In a fluid pressure brake, the combination with a brake pipe, a brake cylinder, and brake controlling valve means operative upon a reduction in brake pipe pressure at a service rate for supplying fluid under pressure to the brake cylinder to effect a service application of the brakes and operative upon a reduction in brake pipe pressure at an emergency rate for supplying fluid under pressure to the brake cylinder to effect an emergency application of the brakes and further operative upon an increase in brake pipe pressure to effect the release of the brakes, means for retarding the rate of flow of fluid under pressure to the brake cylinder in effecting either a service application or an emergency application, and means positioned according to the rate of increase in brake pipe pressure for rendering the retarding means effective or ineffective to retard the rate of flow of fluid to the brake cylinder.

18. In a fluid pressure brake, the combination with a brake pipe, a brake cylinder, and brake controlling valve means operative upon a reduction in brake pipe pressure at a service rate for supplying fluid under pressure to the brake cylinder to effect a service application of the brakes and operative upon a reduction in brake pipe pressure at an emergency rate for supplying fluid under pressure to the brake cylinder to effect an emergency application of the brakes and further operative upon an increase in brake pipe pressure to effect the release of the brakes, means for retarding the rate of flow of fluid under pressure to the brake cylinder in effecting either a service application or an emergency application, valve mechanism operative to one position for rendering the retarding means effective to retard the rate of flow of fluid to the brake cylinder and to another position for rendering the retarding means ineffective to retard the rate of flow of fluid to the brake cylinder, and valve means operative according to the rate of increase in brake pipe pressure for controlling the operation of said valve mechanism.

19. In a fluid pressure brake, the combination with a brake pipe, auxiliary reservoir, brake cylinder and a triple valve device movable to a common position both upon a gradual service and a sudden emergency reduction in brake pipe pressure in which position communication is established for supplying fluid under pressure from the auxiliary reservoir to the brake cylinder, of a selector valve device having one position in which fluid is supplied by operation of the triple valve device to the brake cylinder at a restricted rate and another position in which fluid is supplied by operation of the triple valve device at a more rapid rate, and means operated upon a rapid rate of increase in brake pipe pressure for effecting the movement of said selector valve device to the position in which the flow of fluid is restricted.

In testimony whereof we have hereunto set our hands, this 10th day of November, 1930.

CLYDE C. FARMER.
ELLIS E. HEWITT.